United States Patent [19]

Gindrup

[11] Patent Number: 4,484,023
[45] Date of Patent: Nov. 20, 1984

[54] CABLE WITH ADHESIVELY BONDED SHEATH

[75] Inventor: Wayne L. Gindrup, Hickory, N.C.

[73] Assignee: CommScope Company, Catawba, N.C.

[21] Appl. No.: 399,346

[22] Filed: Jul. 19, 1982

[51] Int. Cl.³ .............................................. H01B 11/06
[52] U.S. Cl. ................................ 174/102 R; 156/332; 174/107
[58] Field of Search ............ 174/102 R, 107, 110 PM, 174/110 F; 525/330.2; 524/556; 156/332

[56] References Cited

U.S. PATENT DOCUMENTS

| | | | |
|---|---|---|---|
| 3,315,025 | 4/1967 | Tomlinson | 174/107 |
| 3,459,877 | 8/1969 | Bullock et al. | 174/107 |
| 3,511,799 | 5/1970 | Clampitt | 524/556 X |
| 3,529,340 | 9/1970 | Polizzano et al. | 174/102 R |
| 3,662,090 | 5/1972 | Grey | 174/107 |
| 3,663,334 | 5/1972 | Mueller-Tamm et al. | 156/332 X |
| 3,677,989 | 7/1972 | Jenkinson | 524/556 |
| 3,681,515 | 8/1972 | Mildner | 174/107 |
| 3,687,748 | 8/1972 | Clock et al. | 174/110 F X |
| 3,703,605 | 11/1972 | Dembiak et al. | 174/107 |
| 3,795,540 | 3/1974 | Mildner | 174/105 B X |
| 4,010,315 | 3/1977 | Mildner | 174/107 |
| 4,049,904 | 9/1977 | Hori et al. | 174/107 |
| 4,104,481 | 8/1978 | Wilkenloh et al. | 174/102 R X |
| 4,173,669 | 9/1979 | Ashida et al. | 524/556 X |
| 4,296,019 | 10/1981 | Nelson et al. | 524/556 X |
| 4,322,574 | 3/1982 | Bow et al. | 174/107 |

FOREIGN PATENT DOCUMENTS 135174  10/1980  Japan ................................ 524/556

OTHER PUBLICATIONS

Chemical Abstracts, vol. 87, No. 4, Jul. 25, 1977, p. 84, No. 24880j, Columbus, Ohio, USA & JP-A-77 40 583 (Nippon Paint Co., Ltd.) 29-03-1977.

Chemical Abstracts, vol. 80, No. 22, Jun. 3, 1974, p. 49, No. 121967f, Columbus, Ohio, USA & JP-A-73 79 275 (Sumitomo Chemical Co., Ltd.) 24-10-1973.

Primary Examiner—John F. Gonzales
Assistant Examiner—Morris H. Nimmo
Attorney, Agent, or Firm—Bell, Seltzer, Park & Gibson

[57] ABSTRACT

An electrical cable comprising a core having at least one inner conductor surrounded by a dielectric material, a metallic sheath surrounding said core, and an adhesive bonding said metallic sheath to said core, said adhesive comprising a water dispersible copolymer of ethylene and an ethylenically unsaturated carboxylic acid forming a thin film between said metallic sheath and said core.

9 Claims, 2 Drawing Figures

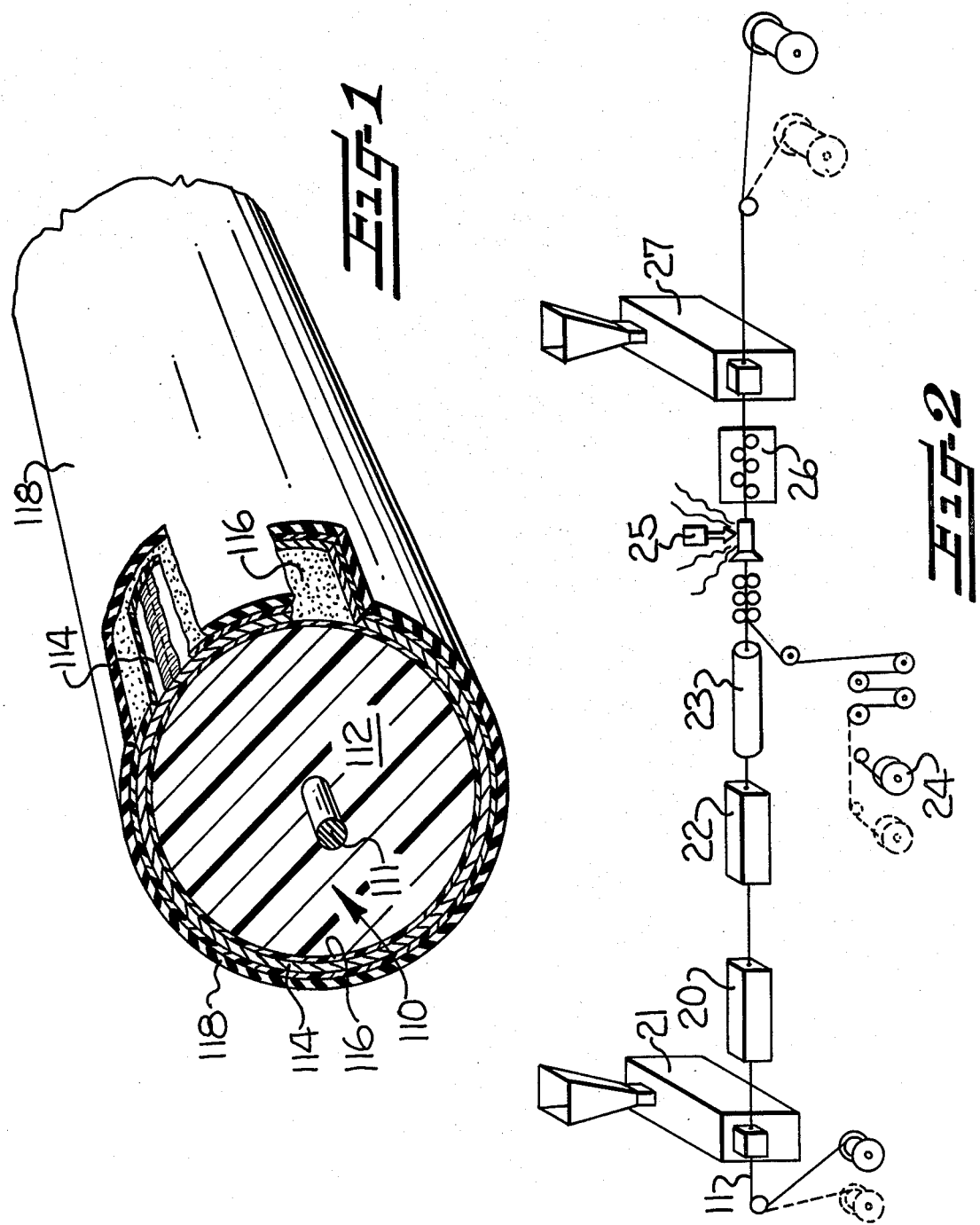

CABLE WITH ADHESIVELY BONDED SHEATH

BACKGROUND OF THE INVENTION

This invention relates to cables of the type which have a core formed of one or more conductors surrounded by a dielectric material, such as a foam plastic material, and with a metallic sheath surrounding the core and serving as the outer conductor of the cable. Cables of this type are used in the transmission of RF signals, such as television signals, for example.

It has been previously recognized that for cables of this type it is desirable for several reasons to bond the metallic sheath to the core. Bonding of the sheath to the core prevents the core from pulling back within the sheath, and bonding seals the cable against penetration of moisture. The foam dielectric used in the core of the cable is desirably formed of a nonpolar material, such as polyethylene foam for example, so as to avoid adversely affecting the electrical properties of the cable. However, the nonpolar nature of the dielectric makes it difficult to achieve a good bond between the dielectric and the metal sheath. It has also been previously recognized that a particularly suitable class of adhesive for accomplishing bonding of the metallic sheath to the foam dielectric of the core are polar thermoplastic copolymers of ethylene and an ethylenically unsaturated carboxylic acid, and in particular ethylene acrylic acid copolymers. For example, the use of such adhesives in cables is disclosed in the following patents:

| U.S. Pat. No. | Inventor | Issue Date |
| --- | --- | --- |
| 3,315,025 | Tomlinson | April 18, 1967 |
| 3,459,877 | Bullock et al | August 5, 1969 |
| 3,662,090 | Grey | May 9, 1972 |
| 3,681,515 | Mildner | August 1, 1972 |
| 3,795,540 | Mildner | March 5, 1974 |
| 4,010,315 | Mildner | March 1, 1977 |

Because of the thermoplastic nature of the ethylene acrylic acid copolymer adhesive, it is typically applied to the substrate with heating, e.g. by extrusion coating or by application of the adhesive in powdered form accompanied by fusion. The adhesive layer is usually about one to five mils in thickness.

The present invention is based upon the recognition that the polar nature of the ethylene acrylic acid copolymer adhesive adversely affects the electrical characteristics of the cable, and for this reason, as well as for reduction in material cost, it is desirable to make the adhesive layer as thin as possible. However, with the conventional methods of application noted above there is a limitation to how thin the adhesive can be applied. Accordingly, one of the objectives of the present invention is to provide a method for producing cable with a metallic sheath bonded to the core and wherein the adhesive can be applied in a thinner layer than heretofore possible. Still another objective of the invention is to provide a suitable adhesive for bonding the core to the metallic sheath wherein the adhesive can be applied in a thinner layer than heretofore possible. A related objective is to provide an improved cable utilizing such an adhesive.

One of the problems which is encountered in applying thermoplastic ethylene acrylic acid copolymer adhesives by the conventional methods heretofore available is that the heat which is necessary for application of the adhesive adversely affects the thermoplastic foam dielectric of the core and thus makes it difficult or impractical to apply the adhesive directly to the core component. For example, extrusion coating of the adhesive directly onto the core component tends to collapse the foam dielectric and thus impair its electrical characteristics. Consequently, the usual practice is to apply the adhesive coating to the metal foil used for forming the metallic sheath, as will be seen from the patents cited above. However, this approach does not lend itself for application of the adhesive to cables in which the metallic sheath component is of an electrically and mechanically continuous construction and formed from extruded seamless tubing or from longitudinally welded tubing.

SUMMARY OF THE INVENTION

In accordance with the present invention, these problems are overcome by providing a copolymer of ethylene and an ethylenically unsaturated carboxylic acid which can be applied as an aqueous dispersion to form a very thin film of adhesive for bonding the metallic sheath to the core component. The copolymer is rendered water dispersible by partially neutralizing the carboxylic acid, but while leaving sufficient residual carboxylic acid for imparting good adhesive properties for bonding the metallic sheath and the core.

Thus, the present invention is directed to an electrical cable comprising a core having at least one inner conductor surrounded by a dielectric material, a metallic sheath surrounding said core, and an adhesive bonding said metallic sheath to said core, said adhesive comprising a dried water dispersible copolymer of ethylene and an ethylenically unsaturated carboxylic acid forming a thin film between said metallic sheath and said core, and wherein said copolymer is rendered water dispersible by partial neutralization of the ethylenically unsaturated carboxylic acid by reaction with a monovalent metal hydroxide, and wherein a portion of said carboxylic acid is unreacted to provide carboxyl groups present in the adhesive for effecting bonding between said metallic outer conductor and said core.

BRIEF DESCRIPTION OF THE DRAWINGS

Some of the features and advantages of the invention having been stated, others will become apparent from the detailed description which follows, when taken in connection with the accompanying drawings, in which:

FIG. 1 is a perspective view showing a coaxial cable in accordance with the present invention in cross section, and with portions of the cable broken away for purposes of clarity of illustration; and FIG. 2 is a schematic illustration of an arrangement of apparatus for producing the improved coaxial cable of this invention.

DESCRIPTION OF ILLUSTRATED EMBODIMENT

Referring now more particularly to the drawings, FIG. 1 illustrates a coaxial cable produced in accordance with the present invention. The coaxial cable illustrated comprises a core 110 which includes an inner conductor 111 of a suitable electrically conductive material such as copper, and a surrounding continuous cylindrical wall of expanded foam plastic dielectric material 112. In the embodiment illustrated, only a single inner conductor 111 is shown, as this is the arrangement most commonly used for coaxial cables of the type used for transmitting RF signals, such as television signals. However, it is to be understood that the present invention is applicable also to coaxial cables having more than one inner conductor insulated from one another and forming a part of the core.

Closely surrounding the core is a continuous tubular metallic sheath 114, which may be formed of various electrically conductive metals. The inner surface of the tubular sheath 114 is continuously bonded throughout its length and throughout its circumferential extent to the outer surface of the dielectric 112 of the core by the use of a thin layer of adhesive 116, described more fully hereinafter. Optionally, if desired to provide added protection to the cable, the outer surface of the sheath 114 may be surrounded by a protective jacket 118. Any suitable prior art composition may be utilized for the outer protective jacket 118.

The water dispersible copolymer adhesive may be used advantageously in the production of cables by any of several methods. A particularly suitable method for forming cables in accordance with the present invention involves forming the core by continuously extruding a foamed dielectric around one or more conductors, and directing the thus formed core through an adhesive bath containing an aqueous dispersion of a copolymer of ethylene and an ethylenically unsaturated carboxylic acid to form a thin adhesive coating on the core, and then surrounding the core with a metallic sheath and heating the adhesive coating to effect bonding of the core to the metallic sheath. The surrounding of the core with the metallic sheath may be accomplished by forming a metallic strip around the core and longitudinally welding to form a continuous tubular sheath. Alternatively, a seamless metallic tube of finite length can be formed by extrusion, and the core may be drawn longitudinally into the seamless tube, followed by sinking of the tube onto the core. In another method of cable manufacture, the adhesive may be applied to a metal strip and the adhesive coated strip thereafter applied by wrapping about the core.

The adhesive polymer which is used in accordance with the present invention is a thermoplastic random copolymer of ethylene and one or more ethylenically unsaturated carboxylic acids, which polymer has been rendered water dispersible by partial neutralization of the carboxylic acid as hereinafter more fully described.

The carboxylic acid monomer is preferably selected from ethylenically unsaturated mono- and poly-carboxylic acids and acid anhydrides having from 3 to 8 carbon atoms per molecule and partial esters of such polycarboxylic acids where the acid moiety has at least one carboxylic acid group and the alcohol moiety has from one to 20 carbon atoms. The copolymer may consist essentially of ethylene and one or more of such ethylenically unsaturated carboxylic acids, or can also contain small amounts of other monomers copolymerizable with ethylene. Specific examples of suitable ethylenically unsaturated carboxylic acids include acrylic acid, methacrylic acid, fumaric acid, maleic acid, crotonic acid, itaconic acid, maleic anhydride, monomethyl maleate, monoethyl maleate, monoethyl fumarate, monoethyl fumarate, tripropylene glycol monomethyl ether acid maleate, ethylene glycol, monophenyl ether acid maleate, etc. Among these carboxylic acids, acrylic acid itself is preferred.

The copolymers can be prepared by known methods, for example, by subjecting a mixture of ethylene and an acrylic acid to high pressures and elevated temperature in the presence of a suitable catalyst.

These copolymers are commercially available from various sources and contain varying amounts of acrylic acid ranging from about 3 percent to about 20 percent or higher. The copolymers useful in the present invention should have an acrylic acid content of at least about 12 percent and most desirably at least about 15 percent, in order to be made water dispersible. The copolymer may be rendered water dispersible by reaction with an alkaline neutralizing agent, such as an alkali metal hydroxide or ammonium hydroxide. Typically this is carried out by mixing the polymer and an aqueous solution of the alkaline neutralizing agent in a suitable reaction vessel for 2 to 3 hours with heating and stirring.

In order to maintain effective adhesive properties, it is important that the copolymer be only partially neutralized. By "partially neutralized" it is meant that the copolymer is reacted with a stochiometric quantity of neutralizing agent less than that required to react with all of the carboxyl groups of the carboxylic acid. Thus a portion of the carboxyl groups of the copolymer remain unreacted and present in the copolymer. Preferably, the partially neutralized water dispersible copolymer should contain at least 2 percent by weight of unreacted ethylenically unsaturated carboxylic acid.

While various alkaline neutralizing agents can be used to react the copolymer and render it water dispersible, some agents have characters which render their use objectionable in certain applications as a cable sheath adhesive. For example, copolymers which have been solubilized by reaction with ammonium hydroxide evolve ammonia gas when heated, which is highly corrosive to the copper center conductor. Trimethylamine as a neutralizing agent is not corrosive, but produces an undesirable fishy odor. For use in the present invention it is preferred that the copolymer be reacted with monovalent metal hydroxides, e.g. hydroxides of sodium, lithium, potassium or rubidium. This class of alkaline neutralizing agent produces stable dispersions of the copolymer adhesive without undesirable effects such as those noted above.

EXAMPLE 1

Preparation of Partially Neutralized Adhesive

An aqueous dispersion of ethylene acrylic acid copolymer containing about 4 percent by weight of unneutralized acrylic acid was prepared as follows:

To 35 gallons of water was added 7.8 pounds of sodium hydroxide with stirring to dissolve the sodium hydroxide. The solution was heated to 180° F. and held at this temperature while 92 pounds of ethylene acrylic acid copolymer (500 melt index, 20% acrylic acid) (Dow Chemical Company EAA XO 2375.30) was added. Stirring was maintained for about 3 hours until all of the EAA was dispersed in the water. The mix was then cooled. Five milliliters of an antifoam agent (BYK-W antifoam available from Mallinckrodt Chem) was added with stirring and the mixture was filtered through fine cheesecloth.

EXAMPLE 2

Application of Adhesive

An arrangement of apparatus similar to that shown in the drawing is used for producing a coaxial cable with the sheath adhesively bonded to the core. The aqueous adhesive dispersion prepared in Example 1 is placed in an open trough 20 at the discharge end of an extrusion apparatus 21.

A continuous copper center conductor is directed through the extrusion apparatus 21 and a foamable polyolefin polymer is coextruded around the center conductor 11 and allowed to expand to form a cable core comprised of the copper center conductor with a surrounding foam dielectric. This cable core is directed into the trough 20 where the cellular foam material is cooled and allowed to harden while simultaneously a coating of the aqueous adhesive composition is applied to the cellular foam. Upon leaving the trough the heat of the cellular foam partially dries the adhesive. The adhesive coated core is directed through a heated tunnel 22 to complete the drying of the adhesive, leaving a thin adhesive coating (about 0.1–1 mils thickness) on the outer surface of the foam dielectric. The adhesive coated core is then directed through a cooling chamber 23. A narrow strip of aluminum is directed from a reel 24 and is formed into a tubular sheath surrounding the foam dielectric. The strip of aluminum then advances through a welding apparatus 25 and the opposing side edges of the strip are positioned into butting relationship and joined together by a continuous longitudinal weld. The assembly then passes through a reduction die 26 where the tubular aluminum sheath is reduced in diameter and brought into close snug relationship with the dielectric. The assembly then passes through an extrusion coating apparatus 27 where a heated fluent coating material is extruded therearound to form a protective outer jacket. The heat of the coating composition also serves to activate the thermoplastic EAA adhesive coating and to form a bond between the sheath and the outer surface of the dielectric.

In the foregoing specification and examples there has been set forth a preferred embodiment of the invention, but it is to be understood that the invention is not limited thereto and may be embodied and practiced in other ways within the scope of the following claims.

That which is claimed is:

1. An electrical cable comprising a core having at least one inner conductor surrounded by a dielectric material, a metallic sheath surrounding said core, and an adhesive bonding said metallic sheath to said core, said adhesive comprising a dried water dispersible copolymer of ethylene and an ethylenically unsaturated carboxylic acid forming a thin film between said metallic sheath and said core, and wherein said copolymer is rendered water dispersible by partial neutralization of the ethylenically unsaturated carboxylic acid by reaction with a monovalent metal hydroxide, and wherein a portion of said carboxylic acid is unreacted to provide carboxyl groups present in the adhesive for effecting bonding between said metallic outer conductor and said core.

2. A cable according to claim 1 wherein said thin film of adhesive has a thickness no greater than about one mil.

3. A cable according to claim 1 wherein said dielectric material comprises a foam plastic material and said metallic sheath comprises a longitudinally welded metal tube.

4. A cable according to claim 1 wherein said dielectric material comprises a foam plastic material and said metallic sheath comprises an extruded seamless metal tube.

5. A cable according to claim 1 wherein said dielectric material comprises a foam plastic material and said metallic sheath comprises a metal strip wrapped about said core.

6. A cable according to claim 1 wherein the copolymer contains at least 2 percent by weight of unreacted ethylenically unsaturated carboxylic acid.

7. A cable according to claim 1 wherein the adhesive comprises an ethylene acrylic acid copolymer containing at least 15 percent by weight acrylic acid.

8. An electrical cable comprising a core having at least one inner conductor and a foam dielectric surrounding said at least one inner conductor, a metallic sheath surrounding said core, and an adhesive bonding said metallic sheath to said core, said adhesive comprising a dried water dispersible random copolymer of ethylene and acrylic acid containing at least 15 percent by weight acrylic acid, with a portion of the acrylic acid being neutralized by reaction with a monovalent metal hydroxide to render the copolymer water dispersible, and with at least 2 percent of the acrylic acid being unreacted to provide carboxyl groups present in the adhesive for effecting bonding between said metallic sheath and said core.

9. An electrical cable comprising a core having at least one inner conductor and a foam dielectric surrounding said at least one inner conductor, a metallic sheath surrounding said core, and an adhesive bonding said metallic sheath to said core, said adhesive comprising a dried water dispersible random copolymer obtained from the copolymerization of ethylene and acrylic acid, with a portion of the acrylic acid being neutralized by reaction with a monovalent metal hydroxide to render the copolymer water dispersible, and wherein a portion of said carboxylic acid is unreacted to provide carboxyl groups present in the adhesive for effecting bonding between said metallic outer conductor and said core.

* * * * *